United States Patent
Anderson

(10) Patent No.: US 7,331,034 B2
(45) Date of Patent: Feb. 12, 2008

(54) DISTRIBUTED SOFTWARE DEVELOPMENT TOOL

(76) Inventor: Thomas G. Anderson, 8421 Manuel Cia Pl., NE., Albuquerque, NM (US) 87122

( * ) Notice: Subject to any disclaimer, the term of this patent is extended or adjusted under 35 U.S.C. 154(b) by 1619 days.

(21) Appl. No.: 09/756,819

(22) Filed: Jan. 9, 2001

(65) Prior Publication Data

US 2002/0144255 A1 Oct. 3, 2002

(51) Int. Cl.
G06F 9/44 (2006.01)
G06F 17/60 (2006.01)

(52) U.S. Cl. ......................................... 717/103; 705/52
(58) Field of Classification Search ................. 705/51, 705/52, 37, 39, 59; 709/203, 205; 707/203, 707/9, 10; 717/100, 103, 120, 108, 106
See application file for complete search history.

(56) References Cited

U.S. PATENT DOCUMENTS

| | | | | |
|---|---|---|---|---|
| 4,558,413 A | * | 12/1985 | Schmidt et al. ............. | 707/203 |
| 5,542,085 A | * | 7/1996 | Kanzaki et al. ................ | 707/6 |
| 5,634,012 A | * | 5/1997 | Stefik et al. ................... | 705/39 |
| 5,659,735 A | * | 8/1997 | Parrish et al. ................. | 707/10 |
| 5,675,802 A | * | 10/1997 | Allen et al. ................... | 717/103 |
| 5,778,368 A | * | 7/1998 | Hogan et al. ................ | 707/10 |
| 6,014,666 A | * | 1/2000 | Helland et al. ................ | 707/9 |
| 6,061,691 A | * | 5/2000 | Fox ........................... | 707/104.1 |
| 6,085,030 A | * | 7/2000 | Whitehead et al. .......... | 709/203 |
| 6,223,343 B1 | * | 4/2001 | Hopwood et al. ........... | 717/101 |
| 6,343,297 B1 | * | 1/2002 | D'Anjou et al. .......... | 707/104.1 |
| 6,457,170 B1 | * | 9/2002 | Boehm et al. ............... | 717/106 |
| 2001/0032189 A1 | * | 10/2001 | Powell ......................... | 705/59 |

OTHER PUBLICATIONS

Doc Searls, It's an Industry!, May 21, 1999, Linux Journal.*
Junichi Suzuki and Yoshikazu Yamamoto, Leveraging Distributed Software Development, Sep. 1999, Computer, vol. 32, Issue 9, pp. 59-65.*
www.kitware.com/vtkhtml/vtkdata/contribcode, visited Jan. 6, 2001.
www.fsf.org/home, visited Jan. 6, 2001.
Open Source Software, by Naomi Hoffman, from web on Jan. 6, 2000.
Appendix A of the e-Touch Programming Manual, by Anderson of Novint Technologies, Inc.

* cited by examiner

Primary Examiner—Kakali Chaki
Assistant Examiner—Trent J Roche
(74) Attorney, Agent, or Firm—V. Gerald Grafe

(57) ABSTRACT

A tool for distributed software development maintains a pool of software modules. A module manager manages submissions to and downloads from the pool. The module manager can be a computer system with programming and resources suited for managing the pool. Developers and users can access the module manager via a computer network such as the internet, or via other transmission mechanisms. A developer intending to submit a module to the pool can specify access conditions associated with the module, and transmit information needed to access the module. The module manager can add the access information and access conditions to the pool. A developer or user intending to access a module from the pool can identify a desired module. The module manager can then determine if the intended access complies with the access conditions associated with the desired module. If it does, then the module manager can transmit the access information.

51 Claims, 4 Drawing Sheets

DISTRIBUTED SOFTWARE DEVELOPMENT TOOL

BACKGROUND OF THE INVENTION

This invention relates to the field of software development, specifically the development of software by programmers at diverse locations and with diverse objectives.

Conventional software development involves individual programmers or tightly coupled teams. Members of the team are generally at the same site. A single common employer or funding source defines the objectives of the development. The tight coupling fosters a close focus of the team's efforts on the defined objective: style and standards, version control, documentation, functionality, debugging, confidentiality, and product release and support can all be woven tightly into the team environment. Such a tight coupling, however, can limit the development to just the resources available to the team (either their own efforts, or efforts of others that the team can afford to purchase), limiting opportunities to leverage the development efforts of others. Leveraging other development can be important to the success of software development in small company, research, and academic environments.

Placing software in the public domain can allow others to leverage its development. Once in the public domain, however, the original developer has no way to manage or benefit from the software, so there is little incentive to place software in the public domain.

Open source software models offer an alternative to public domain, allowing widespread use but ensuring that subsequent developers also make improvements available as open source. In an open source model, software can be licensed for free, with source code available. Consequently, subsequent developers can leverage software available as open source. A typical open source license has provisions requiring that further development of the software must also be made available as open source. A developer, by making the software available as open source, can benefit from later development by others that improves or extends the original software. The wide open nature of open source licensing is well-suited for research and academic settings, but can make version management and commercialization problematic. The open source premise that software be freely available prevents commercial companies from profiting, reducing the likelihood that commercial software will be available as open source or will contribute to improvement of open source software. Various business models have been tried in conjunction with open source software (see, e.g., the various companies offering Linux products and services) but with uncertain success.

There is a need for a distributed software development tool that allows widespread access to software developed by others, without sacrificing the profit possibilities needed to justify commercial development.

SUMMARY OF THE INVENTION

The present invention provides a tool for distributed software development. The present invention maintains a pool of software modules, where a software module can be any software that has some value for subsequent users or developers. A module manager manages submissions to and downloads from the module pool. The module manager can be a computer system (single computer or network of computers) with programming and resources suited for managing the module pool according to the description herein. Developers and users can access the module manager via a computer network such as the internet, or via other software and information transmission mechanisms (e.g., physical transmission of storage media). A developer intending to submit a module to the pool can connect with the module manager, specify access conditions associated with the module (i.e., conditions that apply to access of the module from the module pool), and transmit to the module manager information needed to access the module (e.g., the software module itself, or a pointer to where the software module can be accessed). The module manager can add the access information and access conditions to the module pool. A developer or user intending to access a module from the pool can connect with the module manager and identify a desired module. The module manager can then determine if the intended access complies with the access conditions associated with the desired module. If it does, then the module manager can transmit the access information.

Diverse developers can thereby share access to software modules through the module pool, with the module pool allowing widespread access and accommodating differing business interests via the access conditions associated with the modules in the pool. Users can also directly access software modules from the module pool. Fees (e.g., fixed fees, running royalties, in-kind payments, any other sort of revenue) for accessing and using modules can also be automatically determined, collected, and paid using the module pool and module manager.

The module pool offers numerous advantages. The availability of pre-written software modules can reduce the time to market for new software products. With appropriate access conditions, the same module pool can accommodate developers committed to open source as well as developers interested in commercialization. The module manager can provide version control and distribution management. Module developers can receive payment commensurate with the value of their module without having to directly participate in the commercialization of a full product. The module pool also provides a forum where software can be modified, improved and debugged by the research community.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a tool for distributed software development. The present invention maintains a pool of software modules, where a software module can be any software that has some value for subsequent users or developers, in source or object code or both. A module manager manages submissions to and downloads from the module pool. The module manager can be a computer system (single computer or network of computers) with programming and resources suited for managing the module pool according to the description herein. Developers and users can access the module manager via a computer network such as the internet, or via other software and information transmission mechanisms (e.g., physical transmission of storage media). A developer intending to submit a module to the pool can connect with the module manager, specify access conditions associated with the module (i.e., conditions that apply to access of the module from the module pool), and transmit to the module manager information needed to access the module (e.g., the software module itself, or a pointer to where the software module can be accessed). The module manager can add the access information and access conditions to the module pool. A developer or user intending to access a module from the pool can connect with the module manager and identify a desired module. The module manager can then determine if the intended access complies with the access conditions associated with the desired module. If it does, then the module manager can transmit the access information.

Diverse developers can thereby share access to software modules through the module pool, with the module pool allowing widespread access and accommodating differing business interests via the access conditions associated with the modules in the pool. Users can also directly access software modules from the module pool. Fees (e.g., fixed fees, running royalties, in-kind payments, etc.) for accessing and using modules can also be automatically determined, collected, and paid using the module pool and module manager.

The module pool offers numerous advantages. The availability of pre-written software modules can reduce the time to market for new software products. With appropriate access conditions, the same module pool can accommodate developers committed to open source as well as developers interested in commercialization. The module manager can provide version control and distribution management. Module developers can receive payment commensurate with the value of their module without having to directly participate in the commercialization of a full product. The module pool also provides a forum where software can be modified, improved and debugged by the research community.

Communication

Figure 1:
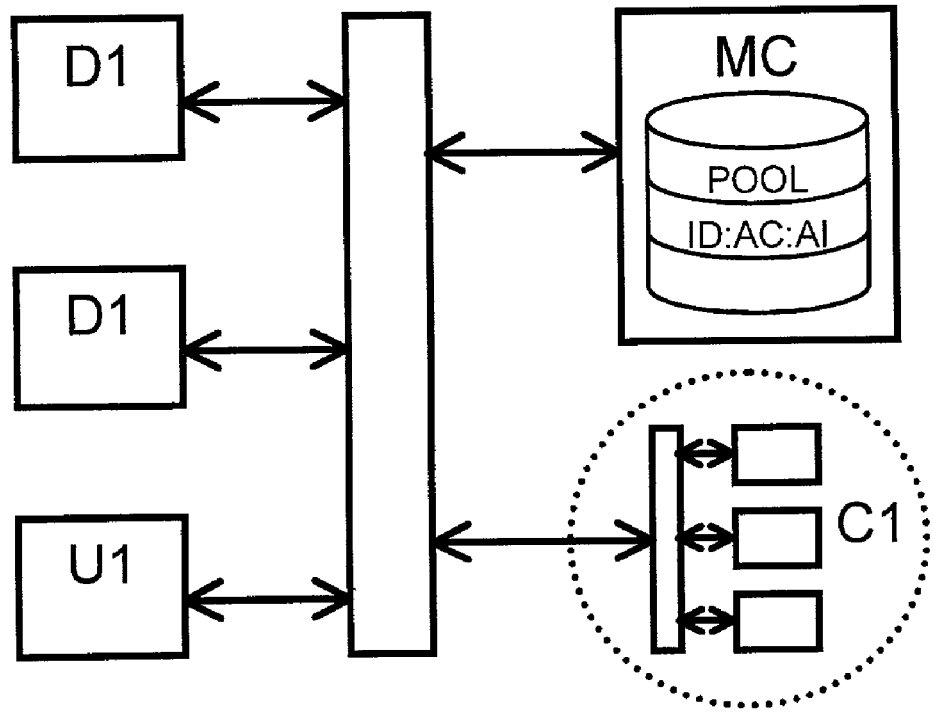
FIG. 1 is a schematic representation of computers and interconnections suitable for practice of the present invention.

FIG. 1 is a schematic representation of various potential actors in a module pool system. Various computers can communicate via a network such as the internet. Some computers D1, D2 can be associated with software developers; some U1 can be associated with software users. Software companies can also communicate via their own connections C1 with the network. At least one computer accessible via the network can be used as a module manager MM. The module manager MM can implement methods according to the present invention to allow developers, users, and software companies to interact with a pool of software modules made available according to the present invention. Note that the present invention can also manage a module pool using other communication paradigms. For example, software modules can be communicated by physical delivery of storage medium.

The Module Pool

The module manager MM can maintain a database of software modules in the pool. The database can include information such as a module identifier ID, access information AI (e.g., the source code of the module, the object code of the module, a pointer to either, or a password allowing access to the module), and conditions (AC) associated with the access of the module. Many other organizations are suitable, and the data can be replaced with pointers or addresses to the data without departing from the invention.

Access Conditions

Associating with a module access conditions set by the developer allows the module manager to accommodate diverse developer objectives in a single development environment. For example, some developers might allow use for noncommercial purposes only. Others might allow commercial use, for free or for a fee. Some might submit source code to allow others to further improve the module. Others might submit only object code, allowing others to use the module but not see the inner workings. As described later, a submitter can specify use conditions in many ways, including, for example, in text, by selection from a list of characteristics, or by selection from a set of categories.

The module manager can also impose access conditions in addition to those set by the developer. For example, the module manager can prohibit further distribution of modules, forcing all development to work through the module manager for distribution. This would be in contrast to contemporary open source systems where software is freely distributed (and consequently difficult to track). The module manager can also impose limitations on the right to make derivative works, for example by requiring that derivative works be submitted to the module pool.

Module Pool Operation

The operation of the module pool can be understood by viewing submission and download operations, and how the module pool can be used to facilitate commercialization of modules.

Submission

Figure 2:
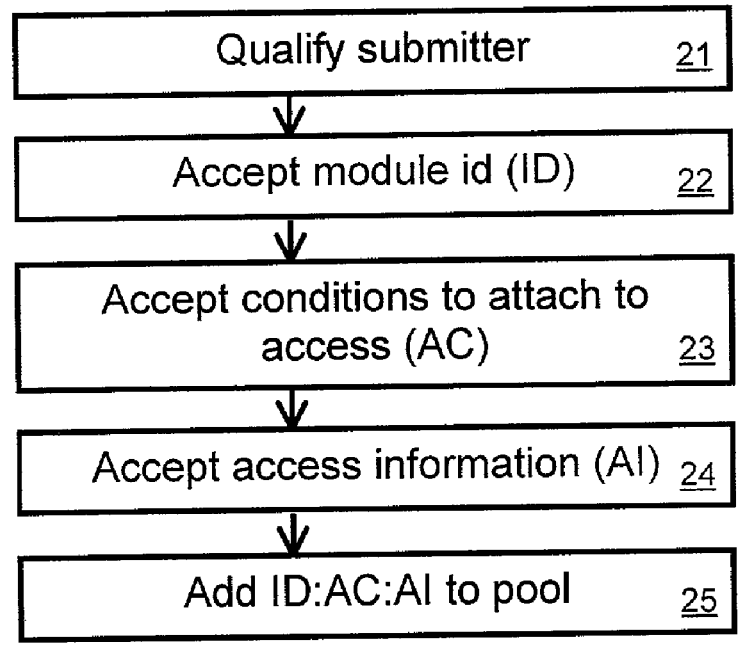
FIG. 2 is a flow diagram illustrating submission of a module to a pool.

Consider the situation where a developer has a software module to be added to the module pool. Steps involved are shown in FIG. 2. The developer initiates a connection with the module manager, perhaps including qualification of the developer as permitted to submit modules 21. The developer interacts with the module manager to establish an identifier of the module 22, and to specify the access conditions associated with the module 23. The developer then transmits to the module manager information required to access the module 24. The module manager then adds the module identifier, the access information, and the access conditions to the module pool 25. The module manager can also use computer network contract mechanisms such as those used in contemporary electronic business to effectively transfer the intellectual property rights involved with the module submission. The module manager can also store information pertaining to the submission for accounting or other purposes, for example by storing the identity of the submitter, identifier of the module submitted, and a record of the contract transaction. This additional information can help track module history, changes, extensions, bug fixes, cooperation with other modules, recommended applications, etc.

Specification of the access conditions can be done in various ways. As an example, the module manager can present to the developer information defining several categories of access conditions. Each category represents access conditions that reflect a common business objective. An example set of categories is shown in the following table; another example set of access conditions is shown later with the example implementation.

TABLE 1

| | |
|---|---|
| Research | Module is available in object code only, and use is limited to noncommercial purposes. No further distribution is allowed. |
| Research and development | Module is available in source and object code. Derivative works are permitted. Use is limited to noncommercial purposes. No further distribution is allowed. |
| Open use | Module is available in object code only. Use for any purpose is allowed. No further distribution is allowed. |
| Open use and development | Module is available in source and object code. Use for any purpose is allowed. Derivative works are allowed. No further distribution is allowed. |
| Public use | Module is available in source and object code. Use for any purpose is allowed. Derivative works are allowed. Further distribution is allowed. |

The module manager can also present to the developer a list of conditions. The developer can select which conditions apply to this module. An example list of conditions is set forth in the following table.

TABLE 2

| | |
|---|---|
| ☑ | Source code available |
| ☑ | Object code available |
| ☑ | Research use allowed |
| ☑ | Research use fee amount |
| ☑ | Commercial use allowed |
| ☑ | Commercial use fee amount |
| ☑ | Derivative works allowed |
| ☑ | Derivative works must return to pool |
| ☑ | Distribution allowed |
| ☑ | Attribution required |

The addition of the module to the pool can be by transmitting the actual software to the module manager, or can be by transmitting the identity and access information needed to access the module from another computer. Transmitting the software can require greater module manager communication and storage; transmitting just the identity and access information can be undesirable if the computer hosting the module is not uniformly available.

Download

Figure 3:
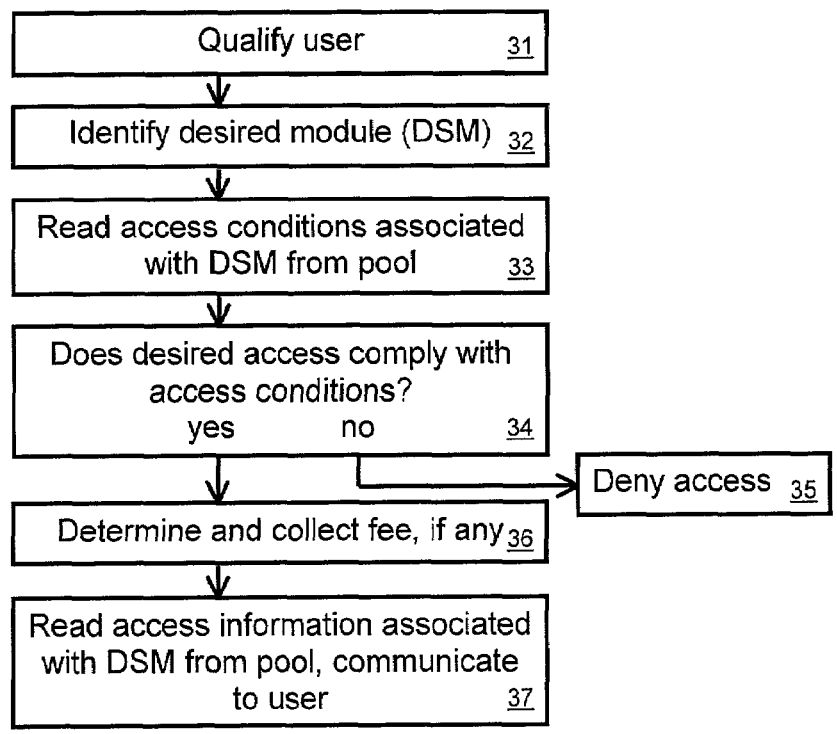
FIG. 3 is a flow diagram illustrating download of a module from a pool.

Consider the situation where a user (or developer) desires to access a module from the pool. Steps involved are shown in FIG. 3. The user can initiate communication with the module manager and identify the desired module; the module manager can also qualify the user as permitted to download the module 31. Once the desired module is identified, the module manager can determine whether the intended access complies with the access conditions associated with the desired module 33, 34. If it does not, then the module manager can deny access to the module 35. If it does, then a fee, if any, can be collected 36, and the module's access information can be transmitted from the module manager to the user 37. The module manager can also implement computer network contracting mechanisms such as those used in contemporary electronic business to make the obligation to comply with the access conditions binding on the user. The module manager can also store information pertaining to the download, for example by storing the identity of the user, identity of the module downloaded, and a record of the contract transaction. This additional information can help track module lineage (new modules can be created from combinations of old modules), changes, extensions, bug fixes, cooperation with other modules, recommended applications, etc.

Identification of the desired module can be accomplished in various ways. For example, the module manager can communicate a list or index of modules available. The module manager can also allow searching of the module pool for modules with, for example, titles or descriptions having certain characteristics or words. If the module manager tracks the identity of submitters, the module manager can allow searching for modules submitted by certain developers. The module manager can also allow searching for modules with certain access conditions, for example, modules allowing commercial use. The module manager can also allow searching for modules with certain access histories, for example, modules most commonly downloaded, or modules most commonly downloaded together.

Determination of the compliance of the intended access with the access conditions can also be accomplished in various ways. For example, the module manager can present the access conditions associated with the desired module and wait for the user to indicate acceptance. As another example, the module manager can have the user indicate the desired access, similarly to the access condition specification for submission, then check the desired access against the access conditions associated with the desired module.

The module manager can impose module pool access conditions, in addition to those attached by the submission. For example, the module pool can impose a condition that prohibits further distribution of the modules. All improvements to software starting in the module pool would thereby be forced to use the module pool for distribution. As another example, the module manager can impose a condition that requires all derivative works to return to the module pool. All changes to module pool software would thereby be required to return to the module pool.

Fee Management

Figure 4:
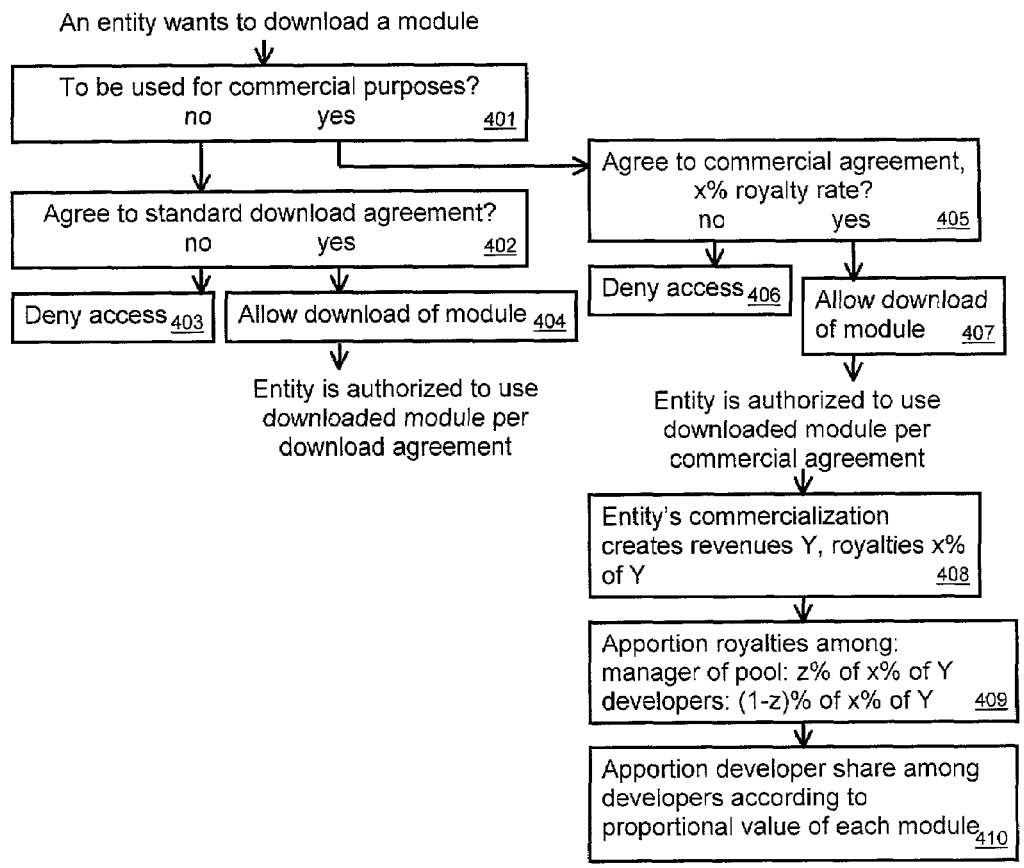
FIG. 4 is a flow diagram illustrating fee determination in the context of multiple derivative modules.

The module manager can also determine and collect fees associated with modules. As a simple example, a module can have a fee for download access or for use. Before allowing a download, the module manager can practice computer commerce mechanisms to collect the required fee. Computer commerce mechanisms can also be used to distribute the fee to the appropriate submitter, and to apportion fees for module collections among various developers. A variation of this example can allow different fees for different access conditions, for example, free for research but fee required for commercial use. FIG. 4 is a flow diagram showing an example of downloads with fee management. The module manager determines if the desired download is for commercial purposes 401. If it is not, and the access complies with the noncommercial download agreement 402, then the download is allowed 404. If the desired access is for commercial purposes, then the module manager can require agreement to a commercial download agreement, including fees or royalties 405. If the download does not agree with the commercial download agreement, then the module manager can deny access 405. If the download does agree with the commercial download agreement, then the download can be allowed 407. The module or modules are then available for commercial application. The commercial application of the module(s) generates revenue Y; a royalty of x % of Y is due from the commercializer to the module manager. z % of the x % royalty can be apportioned to the module manager; the balance can be apportioned among the developers of the module(s) downloaded. That balance can then be apportioned among the developers according to the relative value of the modules. Various methods of such apportionment are described below.

Figure 5:
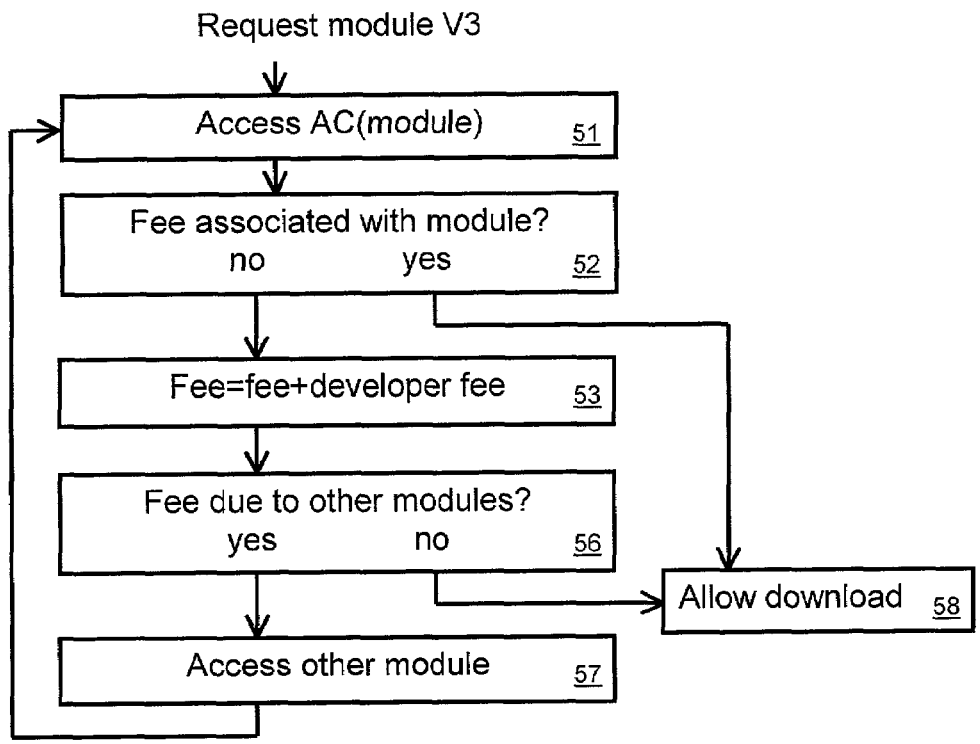
FIG. 5 is a flow diagram illustrating downloads, including royalty apportionment in the context of commercialization of multiple modules.

As another example, the module manager can track the lineage of a module and apportion fees accordingly, as illustrated by the flow diagram of FIG. 5. A first submitter can submit a first version of a module. Downloads of that first module result in fees to the first submitter. A second submitter can download the first module and improve or extend it, then submit the improved second version to the module pool. The module manager can track the relationship between the first version and the second version, and allocate the fees accordingly. For example, the fee for a module can be reduced when a later version is submitted. As another example, later versions can generate reduced fees to the submitters of the parent versions. Consider three versions of a module V1, V2, and V3, submitted by three submitters S1, S2, S3, respectively. V3 derives from V2, which in turn derives from V1. Download of V1 can involve a fee of F1. Download of V2 can involve a fee equal to half of F1 plus F2. Download of V3 can involve a fee equal to one fourth of F1 plus one half of F2 plus F3. Originators can thereby be rewarded for their submissions, with the greatest rewards going to the most recent improvers.

As another example, the module manager can track the desirability of a module. More desirable modules will be downloaded more frequently. The module manager can then set the fees for download accordingly, making more desirable (more valuable) modules require higher fees (or greater shares of fees for module collections). The fee for a module can thereby reflect in real time the desirability of the module. This mechanism can be combined with the previous example, so that precursors of valuable modules can also be rewarded. In operation, a new module can have a default fee. The fee can be reduced as the module ages without downloads. Each download can increase the fee, so that higher demand for a module produces higher fees. If the module is supplanted by an improved or alternative module, then it will enjoy fewer downloads and the fee will decrease. One implementation is expressed in equation 1, where F is the fee to be charged, B is a base fee, and V is a fee amount to be scaled by the demand for the module, as represented by downloads indexed by i.

$$F = B + V \sum_i \frac{1}{(t - t_i)} \qquad \text{Equation 1}$$

Similar valuation methods can be used to apportion fees from commercialization licenses, where a commercialization license can include, for example, a license to distribute products or services based on or including modules from the pool. The fees for such commercialization rights can be apportioned between the module pool administrator and submitters of modules in the pool, for example according to equation 2, where $F_i$ is the fee for module i, $F_T$ is the total fee received, D is a multiplier representing to proportion of the total fee to be distributed to developers, and $r_i$ is a measure of the rank or quality of the $i^{th}$ module. The portion to the submitters can be apportioned according to valuation methods like those above.

$$F_i = F_T D \frac{r_i}{\sum_j r_j} \qquad \text{Equation 2}$$

As another example, the value of modules can be weighted to adjust incentives as shown in Equation 3. For example, weighting early-submitted modules higher than later-submitted modules can provide an incentive for developers to rapidly adopt the module pool as the standard for development and distribution, helping the module pool gain widespread acceptance. Once the module pool is established, the heavier weightings can be reduced or even reversed to provide incentives for continued software development. In Equation 3, $F_T$ is the total fee, $W_T$ is a proportion of the total fee to be allocated among modules, $F_j$ is the fee allocated to module j, $v_i$ is an indication of the value of module i, and $w_i$ is a weighting applied to the value of module i.

$$F_j = F_T W_T \frac{w_j v_j}{\sum_i w_i v_i} \qquad \text{Equation 3}$$

Example Implementation

A specific example implementation is described to further aid in understanding the invention. The example implementation includes a description of the hardware and software design, sufficient for one skilled in the art to construct a suitable system. It also includes description of access conditions set by developers and access conditions set the module manager. The description also describes allocation of commercialization revenue among developers. Some of the advantages of the present invention realizable with the example implementation are described in Appendix A of the e-Touch Programming Manual, by Anderson of Novint Technologies, Inc., incorporated herein by reference.

Module Manager (Module Computer)

Figure 6:
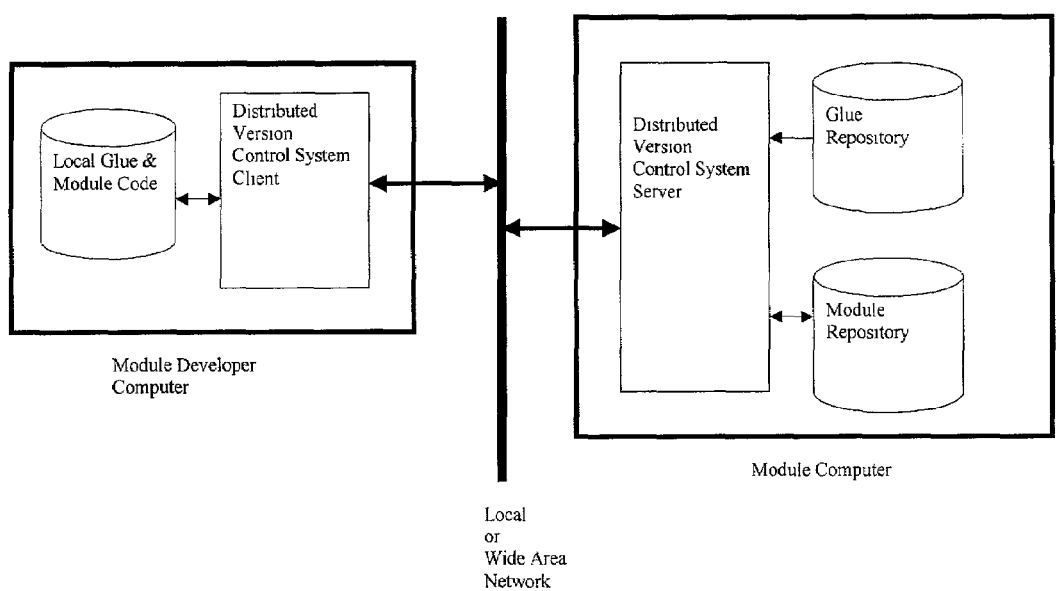
FIG. 6 is a schematic diagram of an example implementation of the present invention.

FIG. 6 illustrates the computer connectivity assumed in this example. A module computer (MC) comprises a connection to a network, version control software, and repositories for glue (software useful with all modules) and modules. The module computer MM can maintain a database of software modules in the pool. The database can include information such as a module identifier, the source code of the module, the object code of the module, and conditions associated with the access of the module. Many other organizations are suitable, and the data can be replaced with pointers or addresses to the data without departing from the invention.

In this example, the module computer MM contains a Glue Repository, a Module Repository, a Distributed Version Control System Server and software/hardware required to connect to a local or wide area network. The Glue Repository is a database that contains the object code, documentation and build scripts for those portions of the overall software system whose source code is not publicly available. The Module Repository is a database that contains source code, object code, documentation and builds scripts for those portions of the overall software system whose source code is publicly available (i.e., the "Open Modules"). The Glue and Module Repositories can be further organized into a directory structure. Each directory can contain major components of the overall software. In the case of the Module Repository, each directory can contain the software associated with one Open Module.

An administrator of the Module Computer can set the ability for a Module Developer to read and/or write software on the MM on a per-directory basis. Permissions can be organized into Permission Groups. A particular Module Developer can belong to one or more Permission Groups. A single Permission Group can be associated with a single directory in the Module Repository.

In typical use, the MM Administrator sets the permissions for the Glue and Module Repositories to such that all Module Developers can read all information in the databases. The permissions for a directory or Module in the Module Repository can further have "write" privileges for a particular Module Developer if that developer has rights to update code for a that Module. The Glue Repository can only be updated by the MM Administrator or Glue Developers that have been given "write" permissions by the MM Administrator.

The repositories can be accessed via a local or wide area network utilizing the server portion of a distributed source control system. As an example, the distributed version control system is the Concurrent Versions System (CVS) and the Repository format is that of the CVS system. Concurrent Versions System (CVS) is a particular distributed version control system and is available as Open Source on the world wide web from cvshome.org. Both server and client versions are available for download at the site. Version 1.11 of CVS for Win32 platforms is suitable for use with the present invention.

The module computer can be implemented using an IBM IntelliStation Model 6865-27U computer with dual Pentium II 650-MHz Xeon processors, 18 GB of disk storage, 512 MB of memory and a built-in Ethernet (IEEE 802.3) $10/100$ megabit per second local area network interface. The computer can run the Microsoft WindowsNT 4.0 SP6 operating system. This computer can run the CVS Version 1.11 distributed version control system in server mode and have the Glue and Module Repositories on its hard disks in a CVS compatible file format. IBM, Intellistation, Pentium, Xeon, Ethernet, Microsoft, Windows, WindowsNT, and CVS may all be trademarks of their respective owners.

The Module and Module Developer Computers can each be connected to the Internet via modems that have an Ethernet (IEEE 802.3) 10 megabit per second interface (e.g., CyberSURFR Wave model cable modem by Motorola) and a Internet Service Provider (e.g., AT&T@Home). The computers can communicate to the Internet using the TCP/IP protocols. CyberSURFR, Wave, Motorola, and AT&T may all be trademarks of their respective owners.

Module Developer Computer

An Open Module Developer can access local copies (i.e., the information is stored on the developer's computer) of current and past versions of Glue and Module software from the MM by utilizing a distributed version control system client over a local or wide area network (such as the Internet). The Open Module Developer always has the ability to read (i.e., get the latest or older versions) and save a local copy of all Glue and Module source code, object code, documentation and builds scripts utilizing a Distributed Version Control System Client. As an example, the client is a CVS client. The Open Module Developer can freely change the Module software in their local copy. If developers have "write" permissions for a Module on the MM, then they can update the Module Repository on the MM using the Distributed Version Control System Client. If developers do not have "write" permissions for a particular Module or they wish to add a new Module to the Module Repository, they can request that these permissions and actions be taken through either manually or automatic means on the MM. As an example, the Module Developer sends an email to the MM Administrator, the administrator implements the requested actions on the MM and notifies the Module Developer via email.

The Distributed Version Control System, along with the use of a local or wide area network, allows many Module Developer Computers and Module Developers to access the Glue and Module Repositories simultaneously. If two or more Module Developers change the source for a particular Module on their local computers and then attempt to update the Module Repository, the Distributed Version Control System allows them to merge their changes.

The Module Developer Computer can be implemented using an IBM IntelliStation Model 6868-25U computer with dual Pentium III 850-MHz processors, 9 GB of disk storage, 512 MB of memory and a built-in and a built-in Ethernet (IEEE 802.3) $10/100$ megabit per second local area network interface. The computer can run the Microsoft WindowsNT 4.0 SP5 operating system. This computer can run the CVS Version 1.11 distributed version control system in client mode and have local copies of the Glue and Module code on the local hard drive in the Microsoft New Technology File System (NTFS) file format. The developer can use the Microsoft Visual C++ Version 6.0 SP 3 compiler to edit, compile and test the software system.

Access Conditions

In the example, modules can be assigned to one of three categories: gold, silver, or bronze. Each category has a set of access conditions associated with it. Modules submitted in the bronze category can be available in object or source code. Bronze modules are available for free for noncommercial use only. Silver modules are available in source code, and are available for commercialization. They are also available for others to modify; modified versions of silver modules cannot be distributed except through the module pool or a commercialization license. Gold modules share the access conditions of silver modules, but have been recognized (by the module pool manager or the developed or user communities) as of especially high value or quality.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A method of using a computer network to facilitate distributed software development, using a pool of software modules maintained with a module manager, comprising the steps of:
   a) establishing a connection via said network between a user computer and a module manager ("connect" step);
   b) accepting at the module manager an indication from the user computer specifying a submission or a download ("mode" step);
   c) if the indication specifies a submission, then (collectively "submission" step):
      i) accepting at the module manager from the user computer access conditions ("SAC") related to a submit software module ("SSM") for submission to said pool ("submit conditions" step);

ii) accepting at the module manager from the user computer access information ("SAI") related to the SSM ("submit access" step);
iii) storing at the module manager the SAC and SAI as part of said pool ("pool addition" step);
d) If the indication indicates a download, then (collectively "download" step):
i) accepting at the module manager information from the user computer identifying a download software module ("DSM") to be downloaded from said pool ("identify download" step);
ii) accessing from the pool the access conditions ("DAC") associated with the DSM, and accepting at the module manager information from the user computer indicating that the DSM are accepted ("download conditions" step);
iii) accessing from the pool the access information ("DAI") corresponding to the DSM, and communicating the DAI from the module manager to the user computer ("transmit download" step);
e) wherein said SAC include at least one of:
i) subsequent distribution limited to object code;
ii) subsequent distribution only allowed on payment of a fee;
iii) subsequent distribution to downloaders for research use is allowed on payment of a fee lower than distribution to downloaders for commercial use;
iv) distribution from the module pool is allowed, but further distribution by downloaders from the module pool is prohibited;
v) distribution from the module pool is allowed, but further distribution by downloaders is allowed only after payment of a fee.

2. The method of claim 1, wherein said computer network comprises the internet.

3. The method of claim 1, further comprising maintaining a user database of users and associated access privileges, and wherein the connect step comprises:
a) accepting information at the module manager identifying a user of the user computer;
b) storing the SAC and SAI only if the access privileges corresponding to said user indicate that said user is allowed to submit the SSM;
c) communicating the DAI only if the access privileges corresponding to said user indicate that said user is allowed to download the DSM.

4. The method of claim 1, wherein the submit conditions step comprises communicating from the module manager to the user computer a set of allowable access conditions, and accepting information at the module manager from the user computer specifying selections from said set.

5. The method of claim 1, wherein the download conditions step further comprises accessing pool access conditions ("PAC") from the module manager, and accepting at the module manager from the user computer an indication that the PAC are accepted.

6. The method of claim 5, wherein the PAC comprises permission to modify the DSM and prohibition against distributing modifications anywhere except the module pool.

7. The method of claim 1, wherein said SAC include an indication of whether or not a software module is available for commercialization.

8. The method of claim 1, wherein the submit access step comprises accepting at the module manager the SSM from the user computer.

9. The method of claim 1, wherein the submit access step comprises accepting at the module manager a computer network identifier identifying a computer from which the SSM can be accessed.

10. The method of claim 1, wherein the submission step further comprises using electronic commerce contracting to transfer intellectual property rights corresponding to the SAC and the SSM.

11. The method of claim 1, wherein said pool comprises a database of software module access information and corresponding access conditions, and wherein the pool addition step comprises adding corresponding entries to the database.

12. The method of claim 1, wherein the identify download step comprises:
a) communicating from the module manager to the user computer descriptions related to software modules in said pool;
b) accepting at the module manager information from the user computer specifying selection of a download software module.

13. The method of claim 1, wherein the identify download step comprises:
a) accepting at the module manager information from the user computer specifying characteristics of a desired software module;
b) determining a set of software modules in said pool having said characteristics;
c) communicating from the module manager to the user computer descriptions related to software modules in said set;
d) accepting at the module manager information from the user computer specifying selection of a download software module from said set.

14. The method of claim 1, wherein the download conditions step comprises:
a) communicating the DAC from the module manager to the user computer;
b) accepting at the module manager a confirmation that the DAC are accepted.

15. The method of claim 1, wherein the download conditions step comprises storing at the module manager a record of said acceptance and said communication of the DAI.

16. The method of claim 1, wherein the transmit download step comprises communicating the DSM directly from the module manager to the user computer.

17. The method of claim 1, wherein the transmit download step comprises communicating a computer identifier identifying a computer where the DSM can be accessed.

18. The method of claim 1, wherein the download step further comprises using electronic commerce contracting to transfer intellectual property rights corresponding to the DAC and the DSM.

19. The method of claim 1, wherein the SAC comprise fee information associated with access to the SSM.

20. The method of claim 19, wherein the download step further comprises communicating the fee information associated with the DSM to the user computer, and accepting payment complying with the fee information at the module manager before communicating the DAI.

21. The method of claim 19, further comprising, when a module is downloaded, storing in a fee-database information related to the download if indicated by the DAC, and wherein the download step further comprises determining a fee from the fee-database and the DAC.

22. The method of claim 21, wherein the download step further comprises communicating said fee to the user computer, and accepting payment complying with the fee at the module manager before communicating the DAI.

23. A method of using a computer network to facilitate distributed software development, using a pool of software modules maintained with a module manager, comprising the steps of:
   a) establishing a connection via said network between a user computer and a module manager ("connect" step);
   b) accepting at the module manager an indication from the user computer specifying a submission or a download ("mode" step);
   c) if the indication specifies a submission, then (collectively "submission" step):
      i) accepting at the module manager from the user computer access conditions ("SAC") related to a submit software module ("SSM") for submission to said pool ("submit conditions" step);
      ii) accepting at the module manager from the user computer access information ("SAI") related to the SSM ("submit access" step);
      iii) storing at the module manager the SAC and SAI as part of said pool ("pool addition" step);
   d) If the indication indicates a download, then (collectively "download" step):
      i) accepting at the module manager information from the user computer identifying a download software module ("DSM") to be downloaded from said pool ("identify download" step);
      ii) accessing from the pool the access conditions ("DAC") associated with the DSM, and accepting at the module manager information from the user computer indicating that the DSM are accepted ("download conditions" step);
      iii) accessing from the pool the access information ("DAI") corresponding to the DSM, and communicating the DAI from the module manager to the user computer ("transmit download" step);
   e) further comprising, when a module is downloaded, storing in a fee-database information related to the download if indicated by the DAC, and wherein the download step further comprises determining a fee from the fee-database and the DAC;
   f) wherein the download step further comprises communicating said fee to the user computer, and accepting payment complying with the fee at the module manager before communicating the DAI;
   g) wherein the fee is determined from an indication of the demand for the DSM, wherein the indication of demand increases with increasing number of downloads of the module, and decreases with increasing numbers of downloads of other modules from the pool.

24. The method of claim 23, wherein the effect of an individual download of the module on the indication of demand decreases with increasing time elapsed since said download, and wherein the effect of an individual download of another module decreases with increasing time elapsed since said download.

25. The method of claim 1, wherein the download step allows download of a plurality of modules, and further comprising determining a fee associated with the download of the plurality of modules, where the fee is allocated among modules according to $$F_j = F_T W_T \frac{w_j v_j}{\sum_i w_i v_i},$$

where $F_T$ is the total fee, $W_T$ is a proportion of the total fee to be allocated among modules, $F_j$ is the fee allocated to module j, $v_i$ is an indication of the value of module i, and $w_i$ is a weighting applied to the value of module i, and wherein modules submitted early in the module pool have a larger $w_i$ than they would have received had they been submitted later.

26. A method of using a computer to accept software modules into a module pool, comprising the steps of:
   a) accepting access conditions ("SAC") related to a submit software module ("SSM") for submission to said pool ("submit conditions" step);
   b) accepting access information ("SAI") related to the SSM ("submit access" step);
   c) storing at the computer the SAC and SAI as part of said pool ("pool addition" step);
   d) wherein said SAC include at least one of:
      i) subsequent distribution limited to object code;
      ii) subsequent distribution only allowed on payment of a fee;
      iii) subsequent distribution to downloaders for research use is allowed on payment of a fee lower than distribution to downloaders for commercial use;
      iv) distribution from the module pool is allowed, but further distribution by downloaders from the module pool is prohibited;
      v) distribution from the module pool is allowed, but further distribution by downloaders is allowed only after payment of a fee.

27. The method of claim 26, further comprising maintaining a user database of users and associated access privileges, and wherein the pool addition step comprises storing the SAC and SAI only if the access privileges corresponding to said user indicate that said user is allowed to submit the SSM.

28. The method of claim 26, wherein the submit conditions step comprises communicating a set of allowable access conditions, and accepting information specifying selections from said set.

29. The method of claim 26, wherein said SAC include an indication of whether or not a software module is available for commercialization.

30. The method of claim 26, wherein the submit access step comprises accepting the SSM from the user computer.

31. The method of claim 26, wherein the submit access step comprises accepting an identifier indicating how the SSM can be accessed.

32. The method of claim 26, wherein said pool comprises a database of software module access information and corresponding access conditions, and wherein the pool addition step comprises adding corresponding entries to the database.

33. A method of using a computer network to manage access to a pool of software modules, wherein the pool comprises entries having module access conditions and module access information, comprising the steps of:
   a) accepting information identifying a download software module ("DSM") to be downloaded from said pool ("identify download" step);

b) accessing from the pool access conditions ("DAC") associated with the DSM, and accepting information indicating that the DSM are accepted ("download conditions" step);

c) accessing from the pool the access information ("DAI") corresponding to the DSM, and communicating the DAI ("transmit download" step);

d) wherein the download step further comprises communicating fee information associated with the DSM, and accepting payment complying with the fee information before communicating the DAI; and e) wherein the fee is determined from an indication of the demand for the DSM, wherein the indication of demand increases with increasing number of downloads of the module, and decreases with increasing numbers of downloads of other modules from the pool.

34. The method of claim 33, further comprising maintaining a user database of users and associated access privileges, and wherein the transmit download step comprises communicating the DAI only if the access privileges corresponding to said user indicate that said user is allowed to download the DSM.

35. The method of claim 33, wherein the submit conditions step comprises communicating a set of allowable access conditions, and accepting information specifying selections from said set.

36. The method of claim 33, wherein the download conditions step further comprises accessing pool access conditions ("PAC"), and accepting an indication that the PAC are accepted.

37. The method of claim 30, wherein the PAC comprises permission to modify the DSM and prohibition against distributing modifications anywhere except the module pool.

38. The method of claim 33, wherein the identify download step comprises:

a) communicating descriptions related to software modules in said pool;

b) accepting information specifying selection of a download software module.

39. The method of claim 33, wherein the identify download step comprises:

a) accepting information specifying characteristics of a desired software module;

b) determining a set of software modules in said pool having said characteristics;

c) communicating descriptions related to software modules in said set;

d) accepting information specifying selection of a download software module from said set.

40. The method of claim 33, wherein the download conditions step comprises:

a) communicating the DAC;

b) accepting a confirmation that the DAC are accepted.

41. The method of claim 33, wherein the download conditions step comprises storing a record of said acceptance and said communication of the DAI.

42. The method of claim 33, wherein the transmit download step comprises communicating the DSM directly.

43. The method of claim 33, wherein the transmit download step comprises communicating a computer identifier identifying a computer where the DSM can be accessed.

44. The method of claim 33, wherein the download step further comprises using electronic commerce contracting to transfer intellectual property rights corresponding to the DAC and the DSM.

45. The method of claim 33, wherein the download step further comprises communicating fee information associated with the DSM, and accepting payment complying with the fee information before communicating the DAI.

46. The method of claim 33, further comprising, when a module is downloaded, storing in a fee-database information related to the download if indicated by the DAC, and wherein the download step further comprises determining a fee from the fee-database and the DAC.

47. The method of claim 45, wherein the download step further comprises communicating said fee, and accepting payment complying with the fee before communicating the DAI.

48. The method of claim 33, wherein the effect of an individual download of the module on the indication of demand decreases with increasing time elapsed since said download, and wherein the effect of an individual download of another module decreases with increasing time elapsed since said download.

49. A method of using a computer network to manage access to a pool of software modules, wherein the pool comprises entries having module access conditions and module access information, comprising the steps of:

a) accepting information identifying a download software module ("DSM") to be downloaded from said pool ("identify download" step);

b) accessing from the pool access conditions ("DAC") associated with the DSM, and accepting information indicating that the DSM are accepted ("download conditions" step);

c) accessing from the pool the access information ("DAI") corresponding to the DSM, and communicating the DAI ("transmit download" step);

d) wherein the download step allows download of a plurality of modules, and further comprising determining a fee associated with the download of the plurality of modules, where the fee is allocated among modules according to $$F_j = F_T W_T \frac{w_j v_j}{\sum_i w_i v_i},$$

where $F_T$ is the total fee, $W_T$ is a proportion of the total fee to be allocated among modules, $F_j$ is the fee allocated to module j, $v_i$ is an indication of the value of module i, and $w_i$ is a weighting applied to the value of module i, and wherein modules submitted early in the module pool have a larger $W_i$ than they would have received had they been submitted later.

50. A method of using a computer to facilitate distributed software development, comprising:

a) Accepting submitted software modules at a module manager, wherein accepting a submitted software module comprises:

i) Accepting access conditions specifying conditions for use of the submitted module;

ii) Accepting access information specifying how to access the submitted module;

iii) Storing the access conditions and access information as related entries in a database;

b) Allowing access by users to modules from the module manager, wherein allowing a user access to modules comprises:

i) Determining a desired software module from the database to be accessed;

ii) Determining if the user's desired access complies with the access conditions associated with the desired software module, and, if so, then communicating the access information associated with the desired module to the user;

c) wherein accepting access conditions for a submitted module comprises accepting an indication of whether or not the module is available for commercialization; and wherein allowing access to modules comprises determining if the user desires access to a set of modules for commercialization, and, if so, then determining an apportionment of fees from commercialization according to $$F_j = F_T W_T \frac{w_j v_j}{\sum_i w_i v_i},$$

where $F_T$ is the total fee, $W_T$ is a proportion of the total fee to be allocated among modules, $F_j$ is the fee allocated to module j, $v_i$ is an indication of the value of module i, and $w_i$ is a weighting applied to the value of module i, and wherein modules submitted early in the module pool have a larger w, than they would have received had they been submitted later.

51. A method of using a computer to facilitate distributed software development, comprising:

a) Accepting submitted software modules at a module manager, wherein accepting a submitted software module comprises:

i) Accepting access conditions specifying conditions for use of the submitted module;

ii) Accepting access information specifying how to access the submitted module;

iii) Storing the access conditions and access information as related entries in a database;

b) Allowing access by users to modules from the module manager, wherein allowing a user access to modules comprises:

i) Determining a desired software module from the database to be accessed;

ii) Determining if the user's desired access complies with the access conditions associated with the desired software module, and, if so, then communicating the access information associated with the desired module to the user;

c) wherein modules in the pool are characterized by membership in one of three classes, wherein the first class denotes modules not available for commercialization, the second class denotes modules available for commercialization, and the third class denotes modules available for commercialization and having a higher quality than modules in the second class.

* * * * *